June 6, 1944. W. K. DALLAS 2,350,594
AIRFIELD TRAFFIC CONTROL
Filed Aug. 12, 1941 2 Sheets-Sheet 1

W. K. DALLAS
INVENTOR
BY
ATTORNEY.

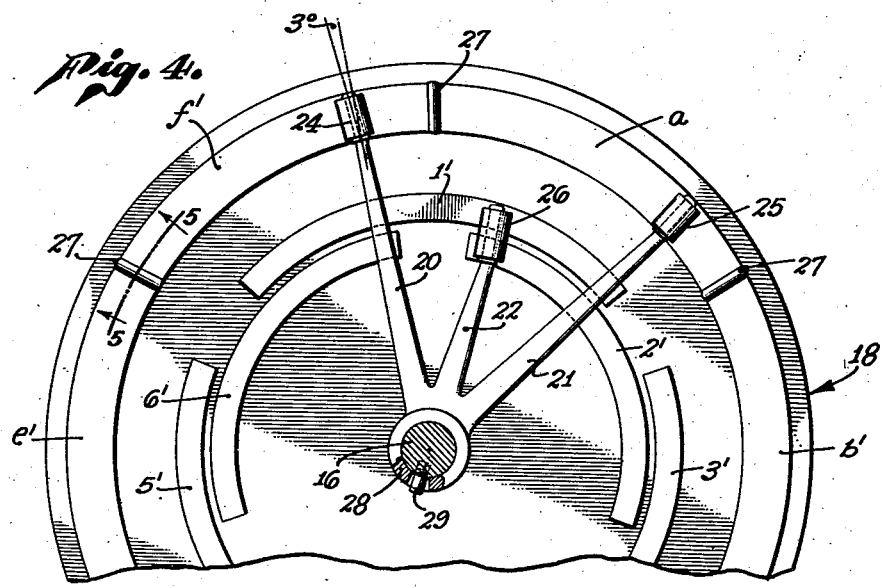
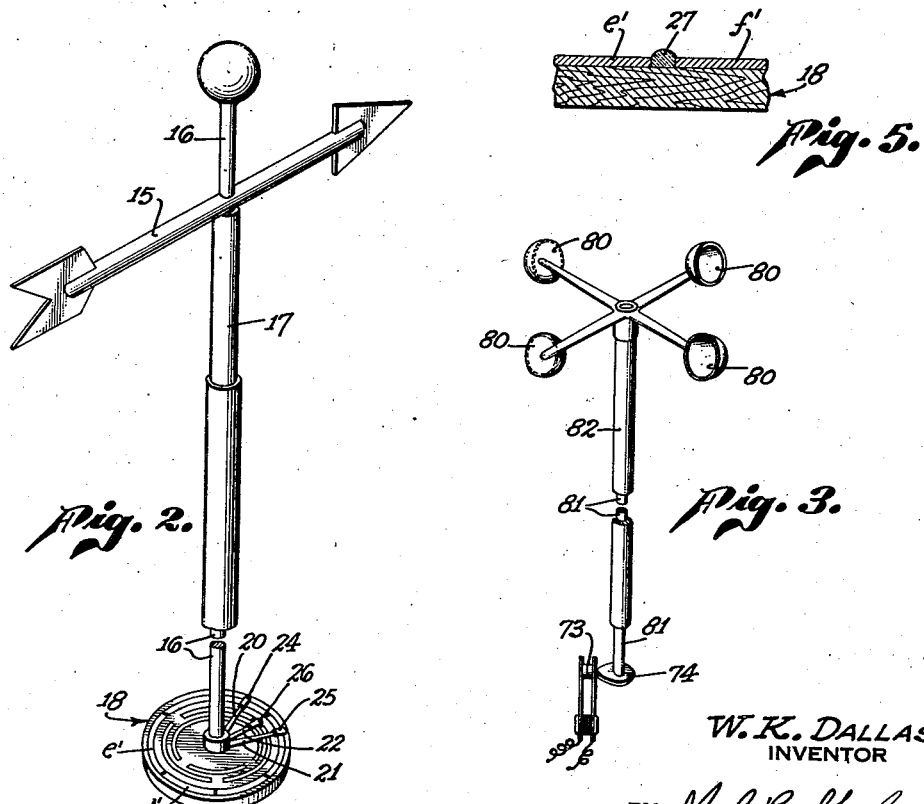

Patented June 6, 1944

2,350,594

UNITED STATES PATENT OFFICE 2,350,594

AIRFIELD TRAFFIC CONTROL

Warren K. Dallas, Los Angeles, Calif.

Application August 12, 1941, Serial No. 406,509

18 Claims. (Cl. 177—352)

This invention relates to the control of aerial traffic and particularly to a method of and means for providing positive and accurate indications to the pilots of aircraft in flight as to wind conditions at a landing field.

It is well known that at present wind directions and velocities are indicated at aircraft landing fields by the use of wind cones or T's, the wind cone being an elongated bag which indicates wind direction by its radial position, and wind velocity, by its angle of inclination to the horizontal. These wind cones and T's are of course very small in comparison to the size of a landing field and thus not easily visible, while their inclination is very difficult to determine from the air. It frequently becomes necessary, therefore, for the pilot to fly low and encircle a field to enable him to observe the cone or T. During the time he is attempting to observe the indicating device, he must also fly his craft, which is generally in a bank with low wing efficiency, and thereby concentrate on the plane's manipulation. Observation of these wind indicators is, of course, more difficult at night, even though illuminated. Thus, wind cones or T's are not the safest means for a pilot to determine landing conditions.

The present invention is directed to an airfield marking system which simply and readily indicates to the pilot while at a considerable and, therefore, safe height and distance from the field, not only a preferred runway of several possible runways on which to land, but also the velocity of the wind at the landing field and the consequent severity of the drift with which he will have to contend in landing on any particular runway. The system provides the pilot with an immediate indication of the preferred runway and also either equal choice alternate runways or a first choice alternate and a second choice alternate. That is, on a field on which three landing and takeoff runways and six landing directions are provided, the invention will always indicate three possible safe landing directions, either the best and two others, which are equally desirable, or two others, one of which is preferable over the other, depending upon the direction from which the wind is blowing with reference to the physical layout of the runways.

It is realized that airfield indicating systems of the general nature of the present invention are well known in the art, but such systems involve complicated apparatus and require considerable modification to adapt them to present airfield marking and lighting systems. In fact, such an upheaval is involved in the adaptation of certain of the known systems to present field markings that their installation and use is impractical. On the other hand, the present invention utilizes a minimum of equipment, the elements of which are no more susceptible to failure than those of the present airfield lighting systems. The type of markings are in conformity with the airfield markings now in use, while the manner of indicating wind velocity is of a type with which the pilots may readily become familiar. Furthermore, a single group of marking elements indicates both the direction in which to land as well as the wind velocity and consequent drift, so it is unnecessary for the pilot to locate two or more indicating devices. The indicators themselves are easily visible, while the system is adaptable to any type of landing field regardless of its size and shape.

The principal object of the invention, therefore, is to facilitate the marking of airplane landing fields.

Another object of the invention is to provide a greater degree of safety for airplane traffic at airfields.

A further object of the invention is to provide a system of airfield marking to facilitate the landing of aircraft.

A further object of the invention is to provide an airplane field marking system which is simple, reliable and easily readable.

A further object of the invention is to provide an airfield marking system which is automatically controlled by the direction and velocity of the wind, or manually set to correspond with any given set of conditions.

A further object of the invention is to provide an airfield marking system which is adapted to automatically indicate wind velocity and the amount of drift to be encountered in several different landing directions.

A further object of the invention is to provide an airfield marking system which indicates a preferred landing direction and next preferred landing directions.

Although the novel features which are believed to be characteristic of this invention will be pointed out with particularity in the appended claims, the manner of its organization and the mode of its operation will be better understood by referring to the following description read in conjunction with the accompanying drawings forming a part thereof in which Fig. 1 is a schematic drawing of the ground portion of the invention;

Fig. 2 is a detail view of one element of the aerial portion of the invention;

Fig. 3 is a detail view of a second element of the aerial portion of the invention;

Fig. 4 is a partial detail view of the contact elements operated by the element in Fig. 2; and Fig. 5 is a cross-sectional detail view of a section of Fig. 4 taken along the line 5—5 thereof.

Figure 1:
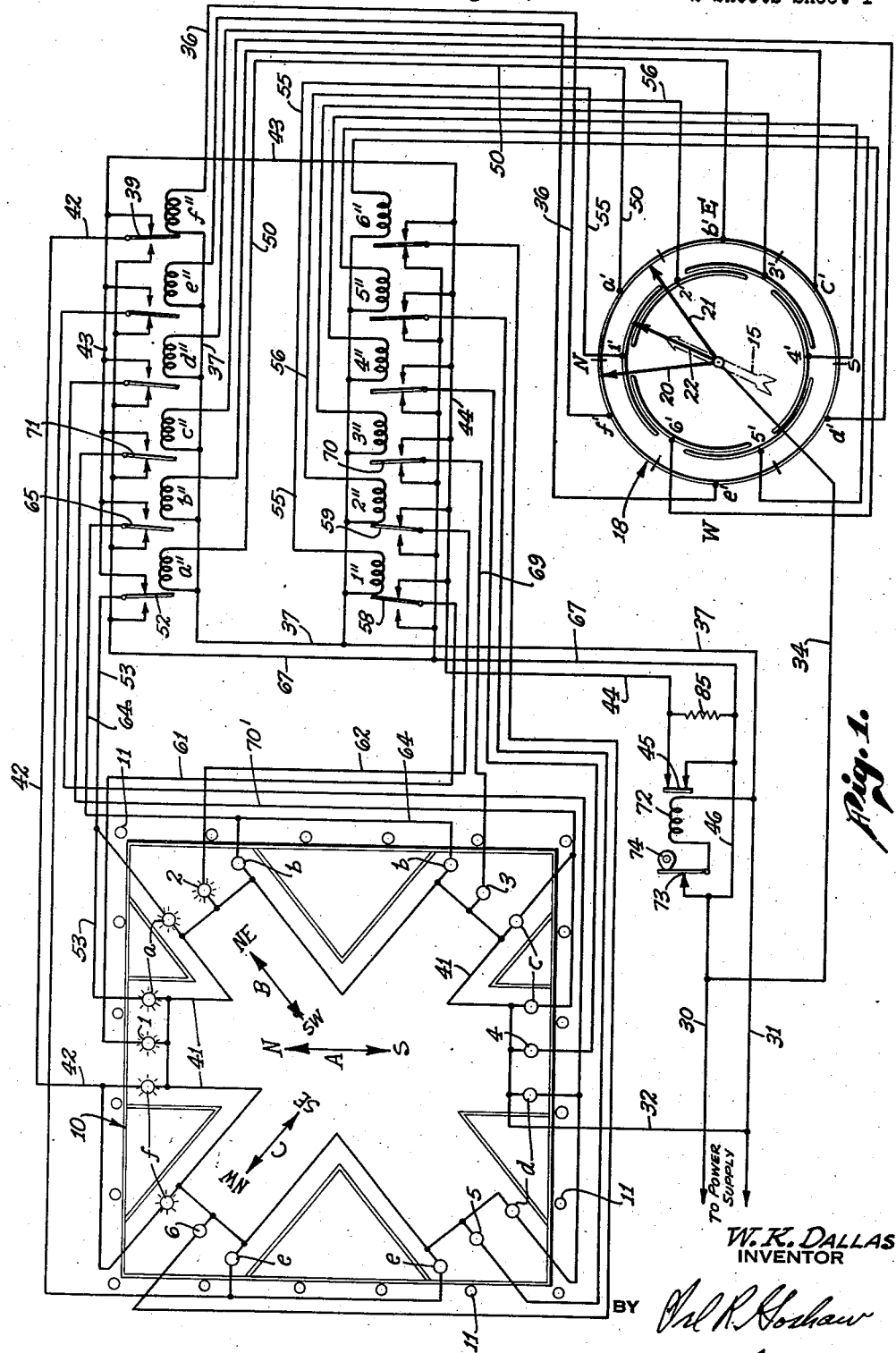

Referring now to Fig. 1, the boundaries of an airfield are shown by the double lines 10, the field being surrounded by steadily burning white field boundary lights 11 of any desired number and spacing. Although this particular field is shown square, it is to be understood that the invention is applicable to fields of rectangular or other shapes. In the particular field illustrated, three runways are shown—a runway A being shown running north and south; a runway B being shown running northeast by southwest; and a runway C being shown running northwest by southeast. Although this field is shown with three such runways disposed at 60° with respect to one another, it is to be understood that the invention is applicable to fields having a greater or lesser number of runways and runways which may have different angles of separation.

Positioned at the end of each runway are groups of three green-colored range lights which, in present fields, are also green. For instance, in the north end of runway A the three lights are 1 and one each of groups $a$ and $f$, while at the south end of runway A are lights 4 and one each of groups $c$ and $d$. Similarly, for runway B in which the center lights are 2 and 5, and the end lights are formed by one each of the groups $a$, $b$, $d$ and $e$. The marking of runway C is similarly accomplished with center lights 3 and 6 and one each of group lights $b$, $c$, $e$ and $f$. The outer lights of each three lights marking the end of a particular runway have been paired with the outer lights of the three at the ends of adjacent runways and form groups $a$, $b$, $c$, $d$, $e$ and $f$, inasmuch as these lights are energized from group circuits. Thus, in a normal field the lights 11 bounding the field are generally white lights, while the range lights marking the ends of each runway are green lights, these lights being arranged as shown in Fig. 1. Applicant's system therefore is readily adaptable to the present system of field marking. The usual field markings utilizing red lights to indicate obstructions such as towers, poles, etc., may also be used in the present system.

The present invention, as mentioned above, is automatic in that it is adapted to be operated solely by the wind to indicate both the direction and velocity of the wind. Mounted on any available structure such as a hangar, is a windvane shown in Fig. 2 comprising a vane 15 rotatable by the wind on its shaft 16 and mounted in a standard 17 suitably fastened to a supporting structure. To the bottom end of the shaft 16 there is mounted a plurality of integrally connected arms 20, 21 and 22 having respective rollers 24, 25 and 26, as may be seen in Fig. 4, rotatably mounted on the ends thereof. The rollers are adapted to both roll and slide over a plurality of electrically conducting contact segments of a commutator 18, the outer rollers 24 and 25 spanning an angle of 60° and contacting any adjacent two of the six segments $a'$ to $f'$, inclusive (see Fig. 1). These segments are insulated from each other by suitable insulation strips shown at 27. The center roller 26 is adapted to contact a plurality of overlapping similar conducting segments 1' to 6', inclusive. It will be noted in this construction that the axes of the rollers 24, 25 and 26 are not coincident with the radial axes of the respective arms 20, 21 and 22 but are offset at an angle of approximately 3°. This feature is for the purpose of providing a combination rolling and sliding contact, the rolling contact reducing the power required for operation, while the slight degree of sliding action maintains a clean contacting surface on the segments.

It will be noted in Fig. 5 that the insulating strips 27 are crowned slightly above the conducting segments $a'$—$f'$, and, in Fig. 4, that these strips are positioned at the same angle as the contacting rollers. The offsetting of the strips to correspond with the rollers insures a line contact between the rollers and the conducting segments when the rollers pass to and from the segments, while the crowning of the insulating strips prevents the rollers from coming to rest on the insulation. To further insure this condition, the arm mounting collar 28 is split and a certain amount of clearance is provided on each side of the setscrew 29. Thus, the roller arms 20, 21 and 22 are provided with a certain looseness of coupling to shaft 16 of wind vane 15 sufficient to permit the rollers to move from one contacting element to the other if the vane 15 comes to rest so as to attempt to position the rollers on insulating strips 27. This arrangement thus provides a safety feature insuring positive operation by preventing any broken electrical circuits in the system.

Referring again to Fig. 1, there is shown a plurality of relays $a''$ to $f''$, inclusive, and a second plurality of relays 1'' to 6'', inclusive. The actuating coils of the lettered relays are connected to the respective conducting segments of the commutator 18 bearing the same respective letters, while the numbered relays are connected to the respectively numbered segments of the unit 18. The lettered relays and segments control the type of operation—flashing or steady burning—of the lamps bearing the same letters on the field, while the numbered relays and segments control the field lamps similarly numbered in the same manner, as will be explained hereinafter.

Power for the lights and relays is provided from any suitable D. C. or A. C. power source over conductors 30 and 31 and a common lamp conductor 32. Power is supplied over conductors 31 and 37 to one side of all relays, the other relay actuating coil connections going to the conducting segments of commutator 18. Power to the lamps is provided through the armatures of the respective relays, a steadily burning circuit being provided to the range lights over the rest contacts of the relays, and a flashing circuit being provided over the operating contacts of the relays.

The specific connections of relays and lamps for a wind direction shown by the vane 15 in Fig. 1 now will be traced. Starting from power conductor 30, power is supplied over this conductor and conductor 34 to all the arms 20, 21 and 22. Since arm 20 is in contact with segment f', this circuit is from the segment over conductor 36 to relay winding f", and then over conductor 37 and conductor 31 to the power supply. Thus, relay f" will be actuated and its armature 39 will be pulled over to make its right-hand contact. The making of this contact will energize group lamps f on the field over a flashing circuit comprising conductor 32, common lamp conductor 41, which is common to one side of all the range lights, through lamps f, over conductor 42, armature 39, right-hand contact of relay f", conductor 43, conductor 44, contacts 45, conductor 46 and conductor 30 to the power supply. Thus, the contact of arm 20 with segment f' will energize relay f", and change the lamps f on the field from a steadily burning condition to a flashing condition.

The next circuit simultaneously energized by the commutator 18 is over the arm 21 which is in contact with segment a'. This circuit is from the segment a' over conductor 50 to relay a", and then back to the power source over conductors 37 and 31. This circuit actuates relay a", the armature 52 of which is swung to the right, making its right-hand contact. The making of this contact energizes lamps a on the field over a flashing circuit from the power source over conductor 32, common conductor 41, through lamps a, over conductor 53, armature 52, right-hand contact of relay a", conductor 43, conductor 44, contacts 45, conductor 46 and conductor 30 to the power supply. Thus, arm 21, making contact with segment a', changes lamps a on the field from a steadily burning condition to a flashing condition.

At the same time that group lamps a and f are energized, as described above, single lamps 1 and 2 are caused to be energized over a flashing circuit made by the arm 22 of commutator 18 contacting conducting segments 1' and 2'. These segments control the actuation of relays 1" and 2" over circuits from the power source over conductors 30 and 34, arm 22, one circuit going from segment 1', over conductor 55 through the winding of relay 1" and then over conductors 37 and 31 to the power supply, while the other circuit goes from segment 2' over conductor 56 through winding of relay 2" over conductors 37 and 31 to the power supply. Thus, relays 1" and 2" are energized and their respective armatures 58 and 59 are pulled to the right, making their respective right-hand contacts. Actuation of relay 1" thus energizes lamp 1 over a flashing circuit including conductor 32, common conductor 41, through lamp 1, over conductor 61, armature 58, right-hand contact of relay 1", conductor 44, contacts 45 and conductors 46 and 30 to the power supply. The flashing circuit for lamp 2 is over conductor 32, common conductor 41, through lamp 2, over conductor 62, armature 59, right-hand contact of relay 2", conductor 44, contacts 45, conductor 46 and conductor 30 to the power supply.

Thus, the illustrated position of the arms of commutator 18 will energize group lamps a and f and single lamps 1 and 2, this indication corresponding with a wind direction shown by the vane 15. From the above-traced circuits, lamps 1, 2, a and f have been energized in a flashing manner through the contacts 45. As mentioned above, the other lamps 3, 4, 5, 6 and b, c, d and e are also energized but over the back or rest contacts of the unactuated relays and are therefore burning steadily. For example, the two lamps b are energized over a circuit including conductor 32, common conductor 41, through lamps b, over conductor 64, armature 65 of relay b", left-hand contact of this relay, conductor 67, conductor 46, and conductor 30 to the power supply. Similarly for lamp 3, which is energized over a circuit including its individual conductor 69, the armature 70 of relay 3", the left-hand or rest contact of this relay, and conductors 67, 46 and 30 to the power source. Lamps c are energized over their conductor 70', armature 71 of relay c", and left-hand contact of this relay and conductors 67, 46 and 30 to the power source. The other lamps 4, 5, 6, d and e are energized over similar circuits in accordance with the respective letters and numbers.

There are provided, therefore, alternate energizing circuits for the single and group lamps, all lamps energized by the actuated relays caused by the contact of arms 20, 21 and 22 on the different segments having a circuit through the contacts 45 to the power source. The other energizing circuit is directly connected to the power source through the rest contacts of the relays. All lamps are therefore energized at all times either through contacts 45 or directly, since the relay swingers are either on their left- or right-hand contacts. By this arrangement, the lamps energized over actuated relays may be given a different treatment or differently characterized from those energized over non-actuated relays. This different treatment is the intermittent energization of the relay-actuated lamps produced by the making and breaking of contacts 45, which is accomplished by a relay winding 72, the energization of which is under control of a contact 73 actuated by a cam 74. A resistance 85 is connected across contacts 45 so that the blinking lamps will not be entirely extinguished when the contacts are broken.

Referring now to Fig. 3, contact 73 and cam 74 are shown. The cam 74 is mounted on the lower end of a shaft 81, at the upper end of which is a standard anemometer having wind cups 80. The shaft 81 is mounted for rotation in a housing 82, the anemometer being mounted on a building, similarly to the vane 15 or in conjunction therewith. The cam 74 mounted on the end of the shaft 81 will rotate at a speed determined by the wind velocity, the rotation of the cam making and breaking the contact 73. The making of contact 73 energizes relay 72 from the power source over conductors 30 and 31 and breaks the energizing circuits of the actuated relay lamps at 45. Thus, in the above example, the lamps 1, 2, a and f will blink or flash as a result of their intermittent energization, while the remaining range lights of the field will burn steadily, the rate of blinking of the flashing lights indicating the wind velocity.

From the above example, a pilot is immediately apprised of the fact that runway A is the preferred runway since all three lights at the leeward end of this runway are blinking or flashing, that the wind is from a southerly direction since the lights at the north or leeward end of the field are blinking, and that the wind has a certain velocity indicated by the rate of blinking. Also, by the two blinking lights at the northeast end of runway B, the pilot is informed that this runway is a first choice alternate as compared with runway C, which has only one blinking light at its northwest end and is thereby indicated as the second choice alternate.

Since landing runways of present-day fields are marked as shown in the present invention and also since pilots are familiar with the flashing code of civil airway route lights located throughout the country, it is not difficult for them to estimate the rate of wind velocity by the rate at which the range lights flash. For instance, this rate could be arranged so that with a wind velocity of five miles an hour, the lamps blink five times per minute, while a wind velocity of ten miles an hour will provide blinking at the rate of ten per minute, and so on for the higher wind velocities. These rates are easily judged since the familiar route beacon lights rotate to cause flashing at a rate of six per minute.

The above illustration indicates three landing positions—a best, a second best, and a third best. Let us assume that the wind is blowing directly from the south, or 180°, so that the runway A is preferred, while runways B and C are equal choice alternates. This is indicated by the invention since although arms 20 and 21 will contact segments a' and f', which will blink lights a and f, as in the first illustration, arm 22 of the commutator 18 will now rest solely on segment I', and only lamp I will be blinked, while lamps 2 and 6 will burn steadily along with all other range lights except above-mentioned groups a, f and lamp I. Thus, the pilot, seeing only lamps I, a and f blinking, will realize that runway A is preferable, that the wind is from the south and that runways B and C are equally as good compared with one another, the rate of blinking of the lights again indicating the wind velocity.

The pilot is also provided with additional information, which is the amount and severity of the drift to be encountered when landing on any of the three indicated runways.

If there is no wind or wind of negligible velocity, such as anything below five miles per hour, all lights associated with the field will be burning steadily, and the field will appear exactly as it does with the present lighting, and a landing can be planned for the most convenient runway. However, if the wind is blowing above the predetermined setting of five miles per hour and is blowing parallel to or within 10° of parallel to any runway, that runway will then be designated as the preferred runway to be used by the flashing or blinking of the three green range lights at its leeward end, the lights flashing in direct proportion to the velocity of the wind then blowing—five-mile wind the lights flash five times per minute; ten-mile wind, ten times per minute, etc. The adjacent runways will be designated as equal choice alternate runways by the flashing of the one range light, at their leeward end, nearest the preferred runway. All other range lights with the exception of the five mentioned will, of course, continue to burn steadily. With this indication the pilot knows that his drift is no more than 10° either way on the preferred runway. He also knows that on either of the equal choice alternate runways the drift could be no less than 50° nor more than 70° and that the direction of his drift, if one of the alternate runways were chosen, is toward the preferred runway. The approximate velocity of the wind is known and therefore the severity of the drift, and his correction is made accordingly.

Now, if the wind is blowing from any point from 190° to 210°, the preferred runway remains the same, but now a first and second choice in alternate runways is provided for and is indicated by the addition to the flashing groups of lights of the middle light of the three located at the leeward end of the B runway, as illustrated. We now have the three range lights at the leeward end of the A runway flashing, indicating a preferred runway on which the drift can be no less than 10°, but no more than 30°, with the direction of drift known to be toward the first choice alternate runway. We now have the two range lights, at the leeward end of the B runway which are nearest the preferred runway, flashing, which indicates a first choice alternate runway on which the drift can be no less than 30° nor more than 50°, with the direction of drift known to be in the direction of the preferred runway. We also have a second choice alternate runway indicated by the single flashing range light, at the leeward end of the C runway, which is nearest to the preferred runway. On this second choice alternate runway the drift will be known to be not less than 70° nor more than 90°, with the direction of drift known to be toward the preferred runway. If the wind now changes to 230°, the lights will change to indicate runway B as the preferred runway, the A runway as the first choice alternate, and the C runway approached from the southeast as the second choice alternate with the same limits of drift as before mentioned. If the wind changes to be blowing from a point within 230° to 250°, the B runway will be indicated as preferred, with the A from the north, and C from the southeast runways indicated as equal choice alternates with the same limits of drift as before mentioned.

With the above invention, therefore, a pilot may be apprised at a glance of all factors with regard to wind conditions required to make a safe landing on either a familiar or strange field. Although the invention has been described in connection with lights, which are suitable primarily for night flying, the invention contemplates the use of any elements which may be energized by the circuits for indicating field conditions during daylight hours. The apparatus required is simple, rugged, relatively inexpensive to engineer, build and install. It is thus reliable and substantially increases the safety of aviation. The system is also entirely automatic in its operation and could be installed on outlying airports or emergency fields as well as on fields where traffic control is being handled by a control tower man.

Although the invention has been described as automatically operable by the wind, it is to be understood that the same field markings may be accomplished over the same circuits by manually setting the commutator 18 in accordance with the wind conditions at the landing field. Also the invention is not limited to the use of mechanical relays as shown but may employ any well known type of suitable relay.

What I claim as my invention is:

1. A landing field marking system comprising range lights defining a plurality of landing runways, means for energizing said lights from alternate circuits, means for intermittently making and breaking one of said circuits to indicate wind velocity, and means for selecting a particular circuit for energizing said lights in more than one runway to indicate a choice of runways.

2. A landing field marking system in accordance with claim 1 in which said last-mentioned means includes means under control of the wind for actuating said selecting means to indicate a preferred runway and first and second choice alternate runways.

3. A landing field marking system in accordance with claim 1 in which said making and breaking means is under control of the wind, the rate of said making and breaking being determined by the velocity of the wind.

4. An airfield marking system comprising a plurality of runway marking indicators, a power source, alternate energizing circuits from said power source for each of said indicators, means for selecting one of said circuits for energizing a certain number of said indicators to indicate a choice of runways and wind drift, the remaining indicators being energized over said other circuit to indicate the length of said runways, and means for varying the periods of energization of said selected indicators.

5. An airfield marking system in accordance with claim 4 in which said selecting means includes means for operating said selecting means to energize various numbers of said marking indicators in more than one runway in accordance with wind direction.

6. An airfield marking system in accordance with claim 4 in which said last-mentioned means includes means for operating said last-mentioned means in accordance with wind velocity.

7. An airfield marking system in accordance with claim 4 in which said selecting means is wind-operated to indicate wind direction and drift and said last-mentioned means is wind-operated to indicate wind velocity.

8. The method of indicating a preferred landing direction for aircraft comprising visibly outlining several landing positions by a plurality of indications fixed with respect to a landing field, and varying the character of the activity of certain of said indications in more than one landing position in accordance with the velocity and direction of the wind at said landing field to indicate a choice of landing positions, all of said indications being active at all times to outline all of said landing positions.

9. The method of indicating a preferred landing direction for aircraft comprising visibly outlining several landing positions by a plurality of characterized indications, differentiating between the characterizations of said indications in more than one landing position in accordance with wind direction to indicate a choice of landing positions, and varying the degree of characterization of certain of said indications to simultaneously indicate wind velocity, all of said indications being active at all times to outline all of said landing positions.

10. The method of indicating a preferred landing direction for aircraft comprising visibly outlining several landing locations by a plurality of characterized indications at the ends of said locations, selecting by wind direction in more than one landing location certain of said indications for characterization in a manner different from said other indications to provide a choice between a preferred location and a plurality of alternate locations, and varying the rate of activation of said indications by wind velocity to show wind velocity and drift with respect to any chosen location, all of said indications being active at all times to outline all of said landing positions.

11. A landing field marking system comprising a plurality of lights outlining a plurality of landing runways, two energizing circuits for each of lights, a windvane, an anemometer, a commutator, a plurality of contact arms movable over said commutator by said vane, and a circuit contact in one of said circuits and operated by said anemometer, the position of said arms selecting the lights energized over said contact to indicate a preferred landing runway, a first choice alternate and a second choice alternate the movement of the anemometer making and breaking said selected circuit.

12. An airfield marking system having a plurality of range lights at each end of a plurality of runways, a power source, a first main electrical circuit from said source to said lights, a second main electrical circuit from said source to said lights, each of said circuits having branch circuits for controlling which of said main circuits energizes said lights, switching relays for said branch circuits, a commutator for selectively energizing said relays in accordance with the setting of said commutator, and a relay in said first main circuit for intermittently energizing the lights connected to said first main circuit as selected by said commutator, said intermittently energized lights being selected in more than one runway to indicate a choice of runways and said lights not selected being steadily energized over said second main circuit.

13. An airfield marking system having a plurality of range lights at each end of a plurality of runways, a power source, a first main electrical circuit from said source to said lights, a second main electrical circuit from said source to said lights, each of said circuits having branch circuits for controlling which of said main circuits energizes said lights, switching relays for said branch circuits, a commutator for selectively energizing said relays in accordance with the setting of said commutator, and a relay in said first main circuit for intermittently energizing the lights connected to said first main circuit as selected by said commutator, said lights not selected being steadily energized over said second main circuit, the adjacent end lights of each runway being controlled in pairs over respective branch circuits and the center lights at the ends of each runway being controlled over respective individual branch circuits.

14. An airfield marking system in accordance with claim 12 in which said commutator is adjusted in accordance with wind direction, and said intermittent relay is operated in accordance with wind velocity.

15. In an aircraft landing field marking system, the combination of a plurality of lamps for outlining a plurality of landing runways, a power supply for continuously energizing said lamps to indicate the positions and lengths of said runways at all times, alternate electrical circuits over which said lamps are energized, a commutator for selecting certain of said lamps to be energized over one of said circuits, various numbers of lamps being selected in more than one runway to indicate a choice of runways the remaining lamps being energized over the other alternate circuit, means for controlling said commutator by wind direction and means in the circuit energizing said selected lamps for controlling the rate of energizing said lamps in accordance with wind velocity.

16. In an aircraft landing field marking system, the combination of a plurality of lamps for outlining a plurality of landing runways, a power supply for continuously energizing said lamps to indicate the positions and lengths of said runways at all times, alternate electrical circuits over which said lamps are energized, a commutator for selecting certain of said lamps to be energized over one of said circuits, the remaining lamps being energized over the other alternate circuit, means for controlling said commutator by wind direction and means in the circuit energizing said selected lamps for controlling the rate of energizing said lamps in accordance with wind velocity, the selected lamps indicating the preferred landing runway, a first choice alternate and a second choice alternate, the rate of energization of said selected lamps indicating the wind velocity and drift to be encountered in landing on any particular runway.

17. An aircraft landing field marking system comprising the combination of a plurality of runway marking indicators for continuously indicating several possible landing runways at all times, means for energizing said indicators, and means for varying the character of the energization of certain of said indicators in more than one of said runways in accordance with wind direction and wind velocity to indicate a preferred choice of runways, the variation in choice indicating the wind drift across the landing field.

18. An aircraft landing field marking system in accordance with claim 17, in which said indicators are lamps and said character varying means includes an electrical energy interrupter controlled by wind velocity, said certain lamps simultaneously indicating wind velocity, a preferred runway, first and second choice runways, and wind drift.

WARREN K. DALLAS.